United States Patent [19]

Butch

[11] Patent Number: 5,656,784
[45] Date of Patent: Aug. 12, 1997

[54] FLUID DENSITY VARIATION COMPENSATION FOR FLUID FLOW VOLUME MEASUREMENT

[75] Inventor: James N. Butch, Charleston, W. Va.

[73] Assignee: Eagle Research Corp., Scott Depot, W. Va.

[21] Appl. No.: 778,449

[22] Filed: Jan. 3, 1997

[51] Int. Cl.$^6$ .................................................. G01F 1/00
[52] U.S. Cl. ...................... 73/861.03; 73/30.02; 73/1.35; 364/510
[58] Field of Search ............................ 73/3, 23.38, 30.02, 73/30.03, 269, 861.01, 861.02, 861.03, 861.51; 364/509, 510, 571.04, 571.07

[56] References Cited

U.S. PATENT DOCUMENTS

| | | | |
|---|---|---|---|
| 3,729,995 | 5/1973 | Kovacs et al. | 73/861.03 |
| 4,216,673 | 8/1980 | November | 73/861.03 |
| 4,390,956 | 6/1983 | Cornforth et al. | 73/861.03 |
| 4,901,258 | 2/1990 | Akiyama | 364/571.07 |
| 4,908,760 | 3/1990 | Sinn | 364/571.07 |
| 5,016,187 | 5/1991 | Forkert et al. | 364/571.04 |
| 5,307,668 | 5/1994 | Vander Heyden | 73/30.02 |
| 5,502,660 | 3/1996 | Anderson et al. | 364/571.04 |

*Primary Examiner*—Ronald L. Biegel
*Attorney, Agent, or Firm*—David L. Davis

[57] ABSTRACT

A fluid density compensator for flow volume measurements utilizes a plurality of look-up calibration tables, each for a different density gas. The measurement device provides an output signal having a frequency corresponding to the flow rate therethrough. Each of the tables is indexed by frequency and includes, for each frequency, an expected differential pressure reading across the measurement device and a volume factor. The tables are constructed during the manufacture of the meter measuring device, and are stored in a non-volatile memory of a computer associated with the measuring device. Also associated with the measuring device is a differential pressure sensor across the measuring device. During operation, the output frequency of the measuring device is utilized to index into all of the tables and compare the differential pressure stored in the tables with the actual measured differential pressure. The table having the closest comparison is selected and the volume factor stored in that table is utilized to update the calculated flow volume.

6 Claims, 4 Drawing Sheets

FLUID DENSITY VARIATION COMPENSATION FOR FLUID FLOW VOLUME MEASUREMENT

BACKGROUND OF THE INVENTION

This invention relates to the measurement of fluid flow volume and, more particularly, to compensating such measurements for fluid density variations.

For measuring residential gas volume, gas utilities require that the residential meter be reliable, have high accuracy and be economical. In the past, the meter of choice has been the diaphragm meter, which is encased in a relatively large and unsightly enclosure. It has been proposed to replace the diaphragm meter with the wave meter as the next generation standard residential gas meter. Such a meter is disclosed in U.S. Reissue Pat. No. RE35,114, to Ingman, the contents of which are incorporated by reference herein.

As disclosed in the Ingman patent, such a meter includes a flexible membrane mounted in a housing in the fluid flow path such that the pair of faces of the membrane simultaneously define, with the housing, fluid impermeable seals at at least two different locations along the flow path. The membrane flexes so as to permit passage of discrete quantities of fluid, each having a known volume. The meter generates electrical signals corresponding to flexure of the membrane. By monitoring the frequency of these signals, the fluid flow rate is determined and utilized for calculating overall flow volume. However, for any given flow rate, the frequency of the AC voltage generated by the meter changes if the density of the gas changes. This has been referred to as a "density effect". This density effect is more pronounced at higher flow rates. The density effect between air and typical natural gas has been demonstrated to be approximately 7% at higher flow rates.

In the past, wave meters have been calibrated during manufacture using air. To account for the density effect, two calibration tables are utilized—one for air and one for gas. The table for gas is offset to compensate for the density difference. A major problem arises because the density of natural gas is not constant and, in fact, can vary as much as ±20% from its nominal value. These density changes cause the meter calibration to change and therefore cause a measurement error. It is therefore a primary object of the present invention to provide an arrangement for compensating wave meter volume measurements for gas density variations.

SUMMARY OF THE INVENTION

The density of a flowing gas is a function of its velocity and pressure. Velocity of the flowing gas is represented by the frequency of the AC voltage generated by the motion of the membrane of the wave meter. The motion of the membrane is known, at least in part, to be due to the differential pressure across the meter. This differential pressure can be measured. For any given density of gas, the AC frequency will correspond to an expected differential pressure. If the density is changed and the flow rate is held constant, there will be a corresponding change in the relationship of the AC frequency and the differential pressure. This change is measurable and is used in the practice of this invention to select from among different calibration tables which correspond to different density ranges. Thus, the meter is proved during the manufacturing process using different density gases. For each density gas, a look-up table is constructed by taking measurements at different predetermined flow rates. Each look-up table lists by AC frequency the measured differential pressure and a volume factor corresponding to each predetermined flow rate used during the proving. These tables are stored in a non-volatile memory of a computer. During gas volume measurement operation, the measured AC frequency is used on a repetitive basis by the computer to index into each table. The corresponding differential pressure stored in each table is compared to the measured value. The table with the closest comparison is selected and the stored volume factor from that table corresponding to the measured AC frequency is utilized by the computer to update the calculated flow volume.

BRIEF DESCRIPTION OF THE DRAWINGS

The foregoing will be readily apparent upon reading the following description in conjunction with the drawings in which like elements in different figures thereof are identified by the same reference numeral and wherein.

DETAILED DESCRIPTION

Figure 1:
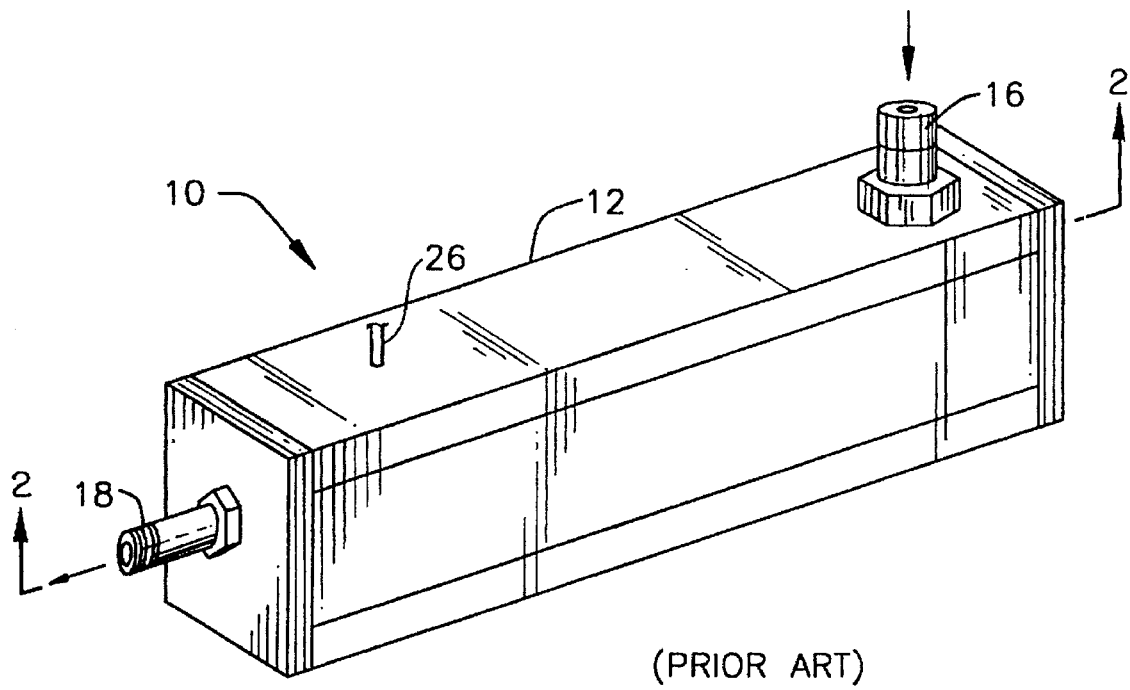
FIG. 1 is a perspective view of a wave meter with which the present invention finds utility.
Figure 2:
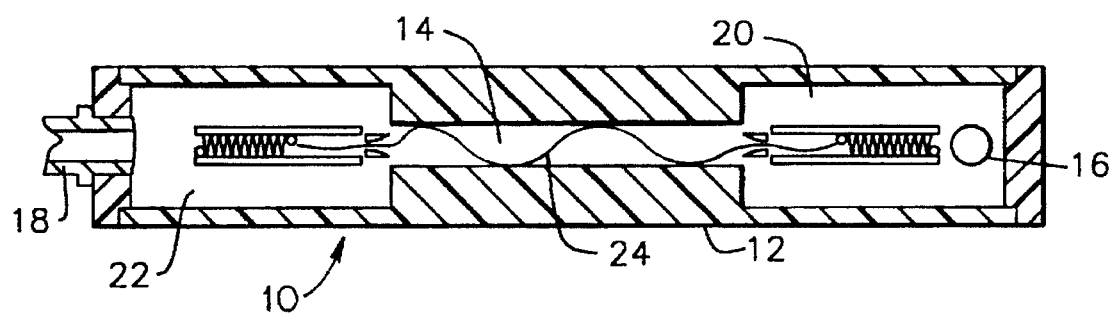
FIG. 2 is a cross sectional view taken along the line 2—2 in FIG. 1.

Referring now to the drawings, FIGS. 1 and 2 illustrate the wave meter disclosed in U.S. Reissue Pat. No. RE35,114 to Ingman, which may be utilized when practicing the present invention. As disclosed, the meter 10 includes a housing 12 defining a fluid flow chamber 14 and ports 16, 18 adapted for coupling in a fluid pipeline to allow fluid to flow through the meter 10.

The housing 12 includes a first end receiving chamber 20 for receiving fluid flow from the inlet port 16 prior to the fluid passing through the flow chamber 14. The chamber 20 permits any debris and, in the case of gas flow, moisture, to be deposited therein prior to flow through the flow chamber 14. There is also provided a second end chamber 22, similar to the receiving chamber 20, for receiving therein any deposition of debris and moisture in a case of flow in a direction opposite to that indicated.

In the meter 10, discrete quanta of fluid, each having a known volume, are permitted to pass across a membrane 24 and volumetric flow may be determined according to the number of such quanta passing across the membrane 24. As disclosed in the referenced Ingman patent, the membrane 24 may have piezoelectric characteristics and wires 26 carry out of the meter 10 electrical signals generated by movement of the membrane 24.

Figure 3:
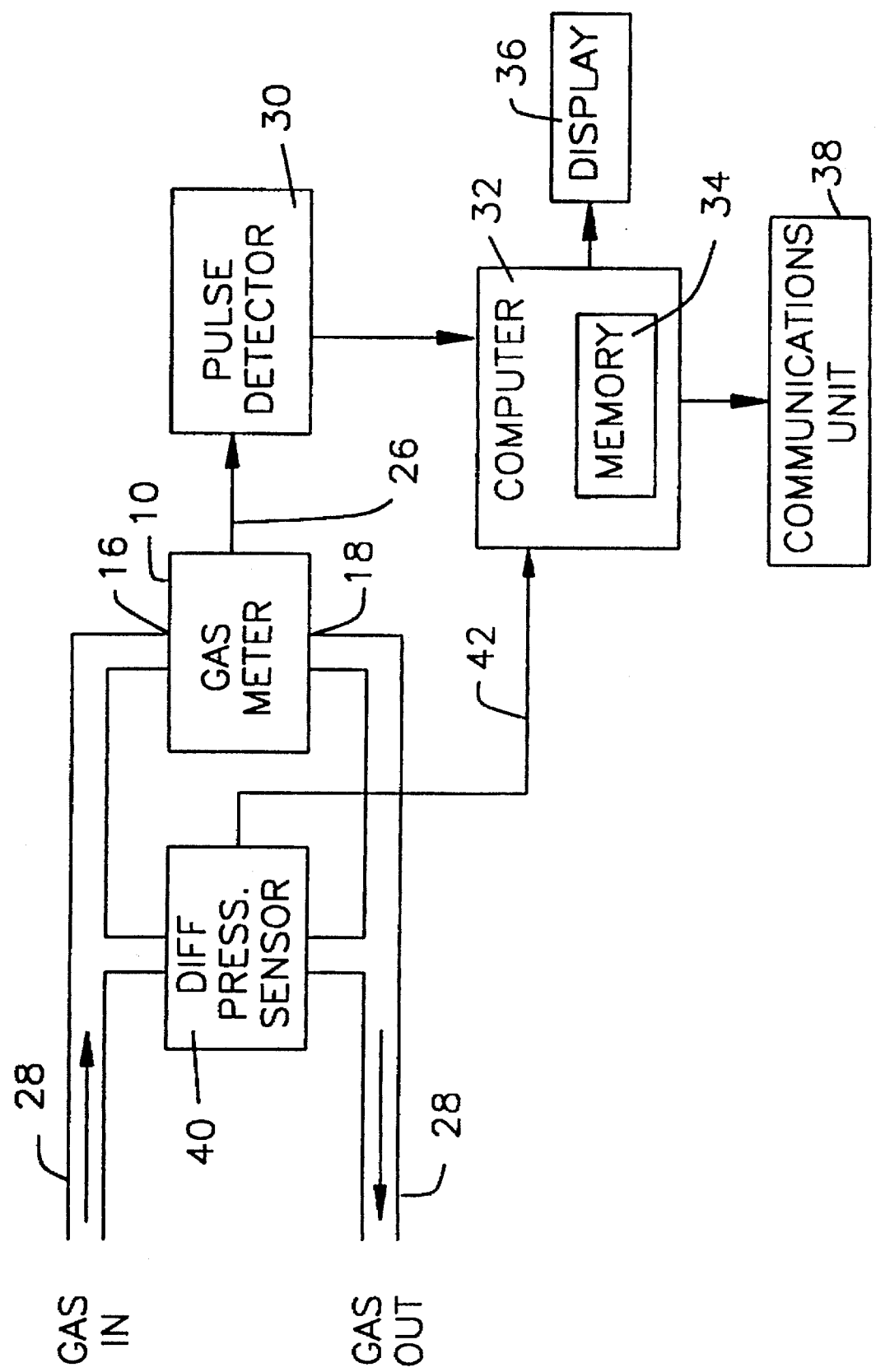
FIG. 3 is a block diagram showing a flow volume measurement and density compensating arrangement constructed in accordance with the principles of this invention.

As shown in FIG. 3, in operation the gas meter 10 is coupled in a fluid pipeline 28 and its output on the wires 26 is provided to a pulse detector 30. The pulse detector 30 is coupled to a computer 32 having a non-volatile memory 34. The computer 32 functions to calculate flow volume through the meter 10 and provides its output to the display 36 and/or the communications unit 38 for transmission to a remote location. A differential pressure sensor 40 is coupled across the meter ports 16, 18 and provides a differential pressure signal over the lead 42 to the computer 32 for use in calculating the flow volume, as will be described in full detail hereinafter.

Figure 4:
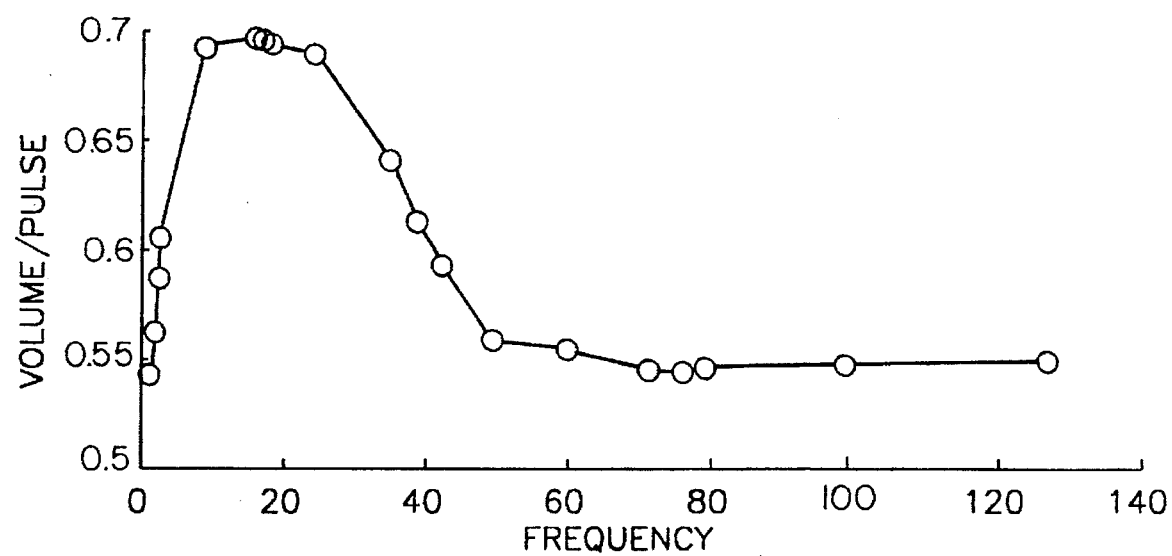
FIG. 4 shows an illustrative relationship between meter output signal frequency and volume per pulse for a meter of the type disclosed in the Ingman patent.

Part of the manufacturing process for the meter 10 includes calibrating the meter 10. The present invention is concerned with such calibration for gas density variations. During the calibration (or proving), a plurality of gases each with a different density is provided. Each of the gases is caused to pass through the meter 10 at each of a plurality of predetermined flow rates. The differential pressure sensor 40 is coupled across the meter 10 and for each of the flow rates there is tabulated the frequency of the pulses at the output of the pulse detector 30 and the differential pressure as measured by the sensor 40. Further, for each of the sets of data, a volume factor corresponding to the predetermined flow rate is included in the tabulation. FIG. 4 illustrates the relationship between the output signal frequency and the volume per output pulse. The tabulations are utilized to construct look-up tables wherein standardized, rather than measured, frequency increments are utilized to index into the tables and the corresponding pressures and volume factors are obtained by interpolation from the measured values.

Illustratively, each table includes fifty entries for a particular density gas, with the indexing frequency varying in equal increments from the lowest expected frequency to the highest expected frequency. It has been found that sufficient accuracy can be obtained using four tables, although more tables can be utilized if desired. Therefore, it is preferred to construct a first table using air, a second table using natural gas of the lowest expected density, a third table using natural gas of the highest expected density, and a fourth table using natural gas of a density substantially midway between the lowest and highest densities. Each meter 10 is shipped from the factory as a unit, along with the differential pressure sensor 40 coupled across the meter 10, the fittings for coupling to the pipeline 28, the pulse detector 30 and the computer 32 including the memory 34, with the tables stored in the memory 34.

Figure 5:
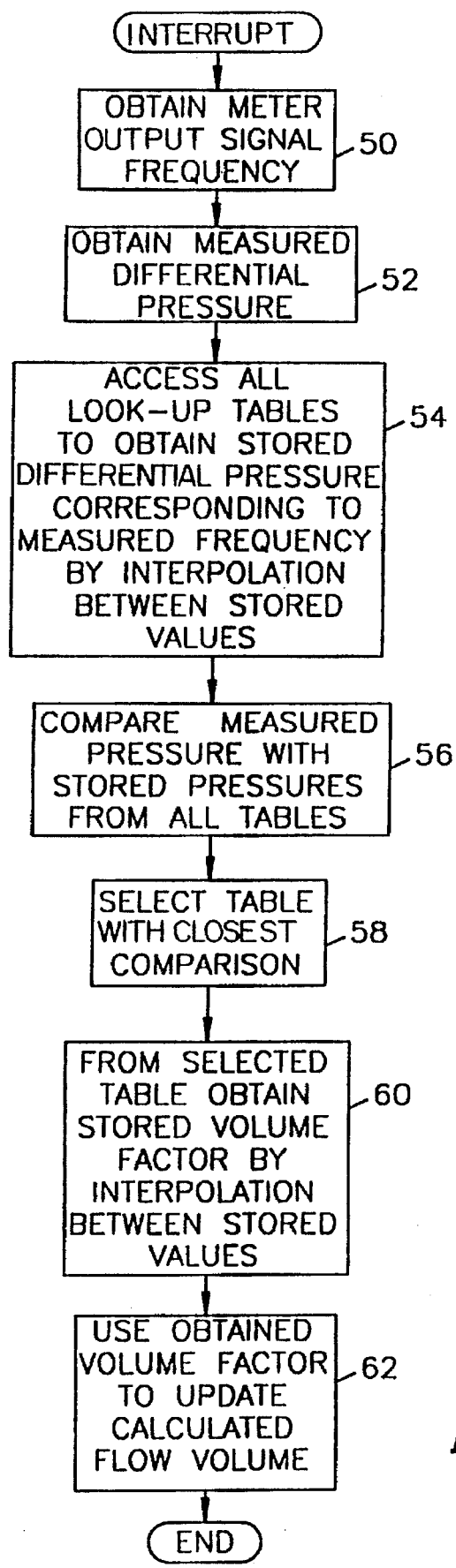
FIG. 5 is an illustrative flow chart of the operation of the computer to calculate density compensated flow volume in accordance with this invention.

Referring now to FIG. 5, in operation, the computer 32 responds to a repetitively generated interrupt signal, illustratively generated at ten second intervals, to obtain flow rate information from the meter 10 and update the calculated flow volume. Thus, upon receiving the interrupt signal, the computer 32 obtains the meter output signal frequency, as indicated by the block 50. At the same time, it obtains the measured differential pressure from the sensor 40, as indicated by the block 52. As shown in the block 54, the computer 32 utilizes the meter output signal frequency to index into each of the look-up tables stored in the memory 34 and obtain from each table the stored differential pressure corresponding to the measured frequency. Since the measured frequency may not be equal to one of the stored frequencies, interpolation between the next highest and next lowest frequency entries is utilized to obtain the expected differential pressure measurement. Next, as indicated by the block 56, the computer 32 compares the measured differential pressure received from the sensor 40 with the interpolated stored pressures from all of the tables, and the table with the closest comparison is selected, as indicated by the block 58. From the selected table, by interpolation between stored values based upon the meter output signal frequency, a volume factor is obtained, as indicated by the block 60. This volume factor is then utilized by the computer 32 to update the calculated flow volume, as indicated by the block 62, in a manner known in the art. The computer can display the calculated flow volume on the display 36 or can transfer the calculated flow volume to the communications unit 38 for transmission to a remote location, depending upon how the system is configured, as will be apparent to one of skill in the art. The computer then waits until the next interrupt signal before repeating the aforedescribed steps.

Accordingly, there has been disclosed an improved method and apparatus for compensating fluid flow volume measurement for fluid density variations. While an illustrative embodiment of the present invention has been disclosed, it is understood that various modifications and adaptations to the disclosed embodiment will be apparent to one of ordinary skill in the art and it is intended that this invention be limited only by the scope of the appended claims.

What is claimed is:

1. A method at least partially implementable in a computer to compensate fluid flow volume measurements in a fluid pipeline for fluid density variations, the measurements being performed by a meter which provides an output electrical signal at a frequency corresponding to the fluid flow rate therethrough, the meter being coupled to said computer which is arranged to receive the output signal provided by the meter and calculate fluid flow volume through the meter, the method comprising the steps of:

a) providing a differential pressure sensor coupled across said meter, said sensor being operative for generating a pressure signal corresponding to the differential fluid pressure across said meter;

b) proving the meter by providing a plurality of fluids each with a different density and for each of said plurality of fluids b1) causing said each fluid to pass through said meter at each of a plurality of predetermined flow rates;

b2) for each of said plurality of predetermined flow rates tabulating the frequency of the meter output signal and the differential pressure measured by the sensor;

b3) constructing a look-up table indexed by meter output signal frequency and containing the measured differential pressure and a volume factor corresponding to the predetermined flow rate; and b4) storing the table in a non-volatile memory of the computer;

c) installing the meter in the fluid pipeline;

d) on a repetitive basis providing to said computer the meter output signal and the sensor pressure signal;

e) comparing, for the frequency corresponding to the provided meter output signal, the corresponding differential pressure measurement stored in each of the tables constructed for each of said plurality of fluids with the sensor measured differential pressure corresponding to the provided sensor pressure signal;

f) selecting the table with the closest comparison; and g) updating the calculated flow volume by utilizing from the selected table the stored volume factor corresponding to the provided meter output signal frequency.

2. The method according to claim 1 wherein the step of providing a plurality of fluids includes the steps of:

providing air;

providing a first natural gas of approximately the lowest expected density;

providing a second natural gas of approximately the highest expected density; and providing a third natural gas of density substantially mid-way between the densities of the first and second natural gases.

3. The method according to claim 1 wherein the step of constructing a table includes interpolating the measured differential pressures and the volume factors corresponding to the predetermined flow rates to obtain corresponding values for a set of predetermined meter output signal frequencies.

4. The method according to claim 3 wherein the step of comparing includes utilizing the measured meter output signal frequency to interpolate between predetermined meter output signal indexing frequencies for each of the tables to obtain interpolated stored differential pressure measurements for comparison with the sensor measured differential pressure.

5. A system for measuring fluid flow volume through a fluid pipeline and compensating for fluid density variations, the system comprising:

meter means installed in the fluid pipeline for providing an output electrical signal at a frequency corresponding to the fluid flow rate through said fluid pipeline;

differential pressure sensing means coupled to said fluid pipeline across said meter means for generating a pressure signal corresponding to the differential fluid pressure across said meter means; and a computer coupled to receive said meter means output signal and said pressure signal, said computer being operative to calculate fluid flow volume through said fluid pipeline;

wherein said computer includes non-volatile memory means for storing a plurality of look-up tables each corresponding to a respective one of a plurality of different density fluids and each containing for a plurality of predetermined meter means output signal frequencies a corresponding differential pressure and a corresponding volume factor; and wherein said computer is programmed to operate on a repetitive basis in accordance with the following steps:
 a) comparing, for the frequency of the received meter means output signal, the corresponding differential pressure stored in each of the plurality of look-up tables with the received pressure signal;
 b) selecting the look-up table with the closest comparison; and
 c) updating the calculated fluid flow volume by utilizing from the selected look-up table the stored volume factor corresponding to the received meter means output signal frequency.

6. The system according to claim 5 wherein the computer operating step of comparing includes utilizing the received meter means output signal frequency to interpolate between predetermined meter means output signal indexing frequencies to obtain corresponding interpolated stored differential pressures for comparison with the received pressure signal.

* * * * *